United States Patent
Rossettini et al.

(10) Patent No.: US 11,345,488 B2
(45) Date of Patent: May 31, 2022

(54) PROPULSION SYSTEM FOR SMALL ARTIFICIAL SATELLITES

(71) Applicant: D-Orbit SpA, Fino Mornasco (IT)

(72) Inventors: Luca Rossettini, Lomazzo (IT); Goncalo Daniel Albano Lopes, Lomazzo (IT)

(73) Assignee: D-Orbit SpA, Fino Mornasco (IT)

( * ) Notice: Subject to any disclaimer, the term of this patent is extended or adjusted under 35 U.S.C. 154(b) by 949 days.

(21) Appl. No.: 15/748,951

(22) PCT Filed: Jul. 25, 2016

(86) PCT No.: PCT/EP2016/067680
§ 371 (c)(1),
(2) Date: Jan. 30, 2018

(87) PCT Pub. No.: WO2017/021191
PCT Pub. Date: Feb. 9, 2017

(65) Prior Publication Data
US 2018/0354658 A1    Dec. 13, 2018

(30) Foreign Application Priority Data

Jul. 31, 2015   (IT) ..................... 102015000040964

(51) Int. Cl.
*B64G 1/10* (2006.01)
*B64G 1/40* (2006.01)
(Continued)

(52) U.S. Cl.
CPC ........... *B64G 1/242* (2013.01); *B64G 1/1085* (2013.01); *B64G 1/26* (2013.01); *B64G 1/285* (2013.01);
(Continued)

(58) Field of Classification Search
CPC . B64G 1/26; B64G 1/40; B64G 1/403; B64G 1/404; B64G 1/409; B64G 2001/1092; B64G 1/1085
See application file for complete search history.

(56) References Cited

U.S. PATENT DOCUMENTS 9,180,984 B2 * 11/2015 Peterka, III ............ B64G 1/242
10,351,268 B2 * 7/2019 Estevez .................. B64G 1/641
(Continued)

FOREIGN PATENT DOCUMENTS

CN    103847982       6/2014
EP    2810876 A2      12/2014
(Continued)

OTHER PUBLICATIONS

International Application No. PCT/EP2016/067680, International Search Report and Written Opinion dated Oct. 26, 2016, 8 pages.
(Continued)

*Primary Examiner* — Brian M O'Hara
(74) *Attorney, Agent, or Firm* — Kilpatrick Townsend & Stockton LLP (57) ABSTRACT

A propulsion system for small artificial satellites comprises a plurality of engines (2) fixable to a frame (101) of a satellite (100); a control unit (3) connected functionally to the engines (2) for sending at least one activation signal (AS) for activating at least one engine (2); the system is selectively configurable at least between a first configuration in which at least one of the engines (2) is activated for correcting the orbit of the satellite (100) and a second configuration in which at least one of the engines (2) is activated for dispersing said satellite (100) relative to another adjacent satellite.

20 Claims, 4 Drawing Sheets

(51) Int. Cl.
    *B64G 1/24*    (2006.01)
    *B64G 1/26*    (2006.01)
    *B64G 1/28*    (2006.01)

(52) U.S. Cl.
    CPC ............... *B64G 1/40* (2013.01); *B64G 1/403* (2013.01); *B64G 1/404* (2013.01)

(56) References Cited

U.S. PATENT DOCUMENTS

| | | | |
|---|---|---|---|
| 11,008,121 B2* | 5/2021 | Kreisel | B64G 1/12 |
| 11,097,858 B2* | 8/2021 | Grübler | B64G 1/425 |
| 11,104,456 B2* | 8/2021 | Schilling | B64G 1/26 |
| 11,117,682 B2* | 9/2021 | Sato | B64G 1/10 |
| 11,242,161 B1* | 2/2022 | White | B64G 1/10 |
| 2002/0179775 A1* | 12/2002 | Turner | B64G 1/1078 244/172.5 |
| 2014/0061386 A1 | 3/2014 | Peterka, III et al. | |

FOREIGN PATENT DOCUMENTS

| | | |
|---|---|---|
| EP | 2878539 A1 | 6/2015 |
| WO | 2017021191 A1 | 2/2017 |

OTHER PUBLICATIONS

International Application No. PCT/EP2016/067680, International Preliminary Report on Patentability dated Feb. 15, 2018, 7 pages.

\* cited by examiner

PROPULSION SYSTEM FOR SMALL ARTIFICIAL SATELLITES

The present invention relates to a propulsion system for small artificial satellites, a satellite incorporating the propulsion system and a method for managing the propulsion system.

In the context of the present text, "small artificial satellite" could mean an artificial satellite formed from one or more cube-shaped modules having a mass in total less than or equal to 100 kg. Artificial satellites of this shape are also known by the name CubeSat.

In fact, with reference to satellites of small dimensions, a distinction is made between so-called microsatellites that have a mass of between 10 kg and 100 kg, so-called nanosatellites that have a mass between 1 kg and 10 kg and so-called picosatellites that have a mass between 100 g and 1 kg.

Preferably, the present invention finds advantageous application in nanosatellites. In this case, the satellites comprise one or more cubic modules with a side substantially equal to 10 cm.

It should also be noted that the present invention may still find application for the other types of satellites of small dimensions.

The use of satellites of small dimensions has increased significantly in recent years.

In fact they were intended almost exclusively as technical demonstrators without further functions. In the course of time, however, and owing to constant miniaturization of on-board components, they have found wide application for example in the context of terrestrial or atmospheric observation, radar mapping and the like.

Small satellites such as the CubeSat typically comprise a cube-shaped frame surrounding a central region for instrumentation and control systems. The space available for these is severely limited. Typical propulsion systems can take up a significant proportion of the available volume leaving little space for instrumentation. For example, each satellite typically accommodates only one engine. This may limit the satellites capabilities or may require the satellite to be formed from a number of satellite modules to provide sufficient space for the required instrumentation.

Small satellites often have a payload that is cylindrical in shape. An example of such a satellite is the Dove, which includes a cylindrical shaped camera. This cylindrical payload takes up most of the volume of the satellite. This leaves little space for a propulsion system.

Lower launch costs allow constellations of similar satellites to be put into orbit at reasonable cost. The launch of satellites in constellations allows missions to be undertaken that are impossible or very difficult if done with a single satellite. For example, constellations of satellites allow simultaneous gathering of data from different positions, which is a very important possibility in the context of terrestrial observation.

Thus, small satellites of the known type are launched in groups (otherwise called "constellations" or "swarms") typically (but not exclusively) in low orbits (LEO, for Low Earth Orbit) by a launch vehicle. In fact, such satellites may also be positioned in MEO (Medium Earth Orbit) and GEO (geostationary orbits).

Once the orbit is reached, the launch vehicle releases the satellites, which tend to be dispersed by inertia. This dispersion allows the satellites to move suitably apart so as to be able to achieve the necessary operational readiness. As an example, attainment of the necessary dispersion may take as much as two weeks.

During the orbits of the constellation of satellites, the latter are subject to decay of their orbit mainly because of the fluid-dynamic interactions with the upper layers of Earth's atmosphere and gravitational interactions.

In other words, the distance of the satellites from Earth gradually decreases to the point when the fluid-dynamic interactions with the atmosphere cause their destruction.

Thus, the life of a small satellite of the known type is normally between a few months and a few years. As an example, it is typically about a year.

It should finally be noted that if failure occurs before the end of the natural life of the satellites, they remain uselessly in orbit up to the end of their life cycle.

Disadvantageously, then, management of small artificial satellites has notable limitations.

Firstly, the average life of the known satellites is limited and cannot be extended.

Furthermore, the average life of the satellites is further limited by the need to wait while their dispersion takes place.

In this context, the technical problem forming the basis of the present invention is to propose a propulsion system for small artificial satellites, a satellite incorporating the propulsion system and a method for managing the propulsion system, which overcome the drawbacks of the aforementioned prior art.

In particular, the aim of the present invention is to provide a propulsion system for small artificial satellites, a satellite incorporating the propulsion system and a method for managing the propulsion system that allow a significant increase in the working life of the artificial satellite on which the system is mounted.

A further aim of the present invention is to provide a propulsion system for small artificial satellites, a satellite incorporating the propulsion system and a method for managing the propulsion system that allow a significant reduction of the times necessary for correct dispersion in flight, after launch, and then of the time required for the start of the operational phase of the satellites on which the system is installed and/or a reduction of the satellite footprint during the re-entry into the atmosphere.

The aforesaid technical problem and the specified aims are substantially achieved with a propulsion system for small artificial satellites, a satellite incorporating the propulsion system and a method for managing the propulsion system comprising the technical features disclosed in one or more of the appended claims.

According to an aspect of the invention there is provided a propulsion system for small artificial satellites, comprising: a plurality of engines fixable to a frame of a satellite; a control unit connected functionally to the engines for sending at least one activation signal for activating at least one engine; characterised in that it is selectively configurable at least between a first configuration in which at least one of the engines is activated for correcting the orbit of the satellite and a second configuration in which at least one of the engines is activated for dispersing said satellite relative to another adjacent satellite.

This has the advantage that the orbit correction can extend satellite mission lifetime.

Optionally, the propulsion system is selectively configurable between the first configuration, the second configuration and a third configuration in which at least one of the engines is activated for causing the satellite to leave orbit, preferably towards the planet.

Optionally, the propulsion system comprises four engines, independent of one another and fixable to the frame of the satellite; said engines being selectively activatable depending on the configuration adopted.

Optionally, the control unit is connectable to a processing unit of the satellite for receiving a configuration signal representative of the configuration required.

Optionally, the control unit is connected to at least one first engine and/or second engine for sending an activation signal to the first engine and/or second engine when the control unit receives a configuration signal representative of the first, second or third configuration.

Optionally, the control unit is connected to a third engine for sending an activation signal to the third engine when the control unit receives a signal representative of the first, second or third configuration.

Optionally, the control unit is connected to a fourth engine for sending an activation signal to the fourth engine when the control unit receives a signal representative of the first, second or third configuration.

Optionally, the propulsion system comprises at least one supporting element on which the engines are fixed; said supporting element being of substantially quadrangular shape, the engines being arranged to correspond to the vertices.

Optionally, the engines comprise corresponding sealed nozzles filled with compressed gas.

Optionally, the propulsion system comprises an inertia wheel connected to the processing unit, said inertia wheel being of annular shape.

According to another aspect of the invention there is provided an artificial satellite of small dimensions comprising: a frame of substantially parallelepiped shape and defining a container compartment; a processing unit contained in the container compartment; a propulsion system as described herein; the engines being fixed to the frame; the control unit of system being connected functionally to the processing unit.

According to another aspect of the invention, there is provided a method for managing a propulsion system for small artificial satellites, comprising the steps of: preparing an artificial satellite comprising a propulsion system as described herein; connecting a processing unit of the satellite to the control unit of the system; determining an operational configuration at least between a first configuration, for orbital correction of the satellite, and a second configuration, for dispersion of the satellite; generating a configuration signal representative of the configuration determined; generating an activation signal as a function of the configuration signal; the activation signal being representative of the activation of at least one engine.

Optionally, the activation signal is representative of the activation of a first engine and of a second engine when the configuration signal is representative of the first configuration.

Optionally, the activation signal is representative of the activation of a third engine when the configuration signal is representative of the second configuration.

According to an aspect of the invention there is provided a propulsion system for a small artificial satellites, comprising: a plurality of engines fixable to the satellite; a control unit configured to control activation of the plurality of engines by sending activation signals to the plurality of engines; wherein the control unit is configured to control the activation of the plurality of engines in a plurality of different modes, each different mode corresponding to the control unit sending different activation signals.

Optionally, each different mode corresponds to the activation of a different combination of engines.

Optionally, each different mode corresponds to the activation of different engines.

Optionally the different modes are pre-stored in the control unit in advance.

Optionally, the control unit is configured to receive a configuration signal from the satellite to determine which one of the different modes is to be executed by the control unit.

An artificial satellite, comprising: the artificial satellite being of substantially parallelepiped shape and having a frame defining a container compartment; and at least one engine located at a peripheral portion of the container compartment.

Optionally, the satellite comprises a plurality of engines arranged at a plurality of parallel edges of the substantially parallelepiped shape.

Optionally, the artificial satellite is cube-shaped.

Optionally, the artificial satellite comprises at least one supporting element fixed to the frame of the satellite and on which the at least one engine is fixed.

Optionally, the artificial satellite comprises a supporting element of substantially quadrangular shape.

Optionally, the supporting element has a central opening of circular shape for housing an operational device of the satellite.

Optionally, the artificial satellite comprises a plurality of separate supporting elements having a profile, as viewed from a face of the parallelepiped shape, in which two side are substantially at right angles to each other.

Optionally, the supporting elements each comprise a concave portion, together forming portions of an opening for housing an operational device of the satellite.

Optionally, the at least one supporting element is arranged substantially parallel to a face of the parallelepiped shape.

Optionally, the at least one supporting element is arranged substantially perpendicular to an elongate direction of the at least one engine.

Optionally, the propulsion system and/or artificial satellite comprises four engines. In one embodiment the propulsion system and/or artificial satellite comprises only four engines.

Further features and advantages of the present invention will become clearer from the representative, and therefore non-limiting, description of a preferred but not exclusive embodiment of a propulsion system for small artificial satellites, a satellite incorporating the propulsion system and a method for managing the propulsion system, as illustrated in the appended drawings, in which.

Referring to the appended figures, a propulsion system for small artificial satellites according to the present invention is designated 1 throughout.

The system 1 is intended to be assembled on an artificial satellite 100. The system 1 is independent of the satellite but can be incorporated into a satellite 100, e.g. retrofitted to the satellite 100.

The satellite 100 is formed from one or more cube-shaped modules assembled together. Each module has an edge length of between 9 cm and 11 cm, preferably substantially equal to 10 cm.

The satellite 100 may comprise any number of cubic modules arranged in any useful conformation. For example, three modules may be arranged linearly to form a cuboid-shaped satellite 100.

In total, the satellite 100 has a mass not greater than 100 kg, preferably not greater than 10 kg.

It should be noted that the satellite 100 may be designed, constructed and launched for carrying out a mission on its own. Alternatively, the satellite 100 may be launched together with a plurality of other similar satellites 100 for orbiting in constellations or swarms.

These satellites 100 execute their own mutually coordinated missions.

The satellite 100 comprises a frame 101 that has a structural function and defines within it a compartment for receiving the instrumentation.

The frame 101 is of substantially parallelepiped shape. The frame 101 is formed from the frames of the cubic modules that make up the satellite 100.

The instrumentation may comprise any operational device 102 that performs one or more functions associated with the mission to be performed. This may be substantially cylindrical in shape, for example.

The instrumentation further comprises a processing unit 103 that is connected functionally to the operational device 102 for controlling it and regulating its functionality.

The satellite 100 further comprises an energy generator (not illustrated) that provides electrical supply to the instrumentation. As an example, the energy generator comprises solar panels arranged externally to the frame 101.

The satellite 100 further comprises a communication device 104 for sending and receiving radio signals to and from a remote control station and/or from similar satellites 100 that are orbiting in formation.

The system 1 is housed in the compartment defined by the frame 101 of the satellite 100.

The system 1 comprises a plurality of engines 2 which, when the system 1 is on board the satellite 100, are fixed to the frame 101.

Figure 1:
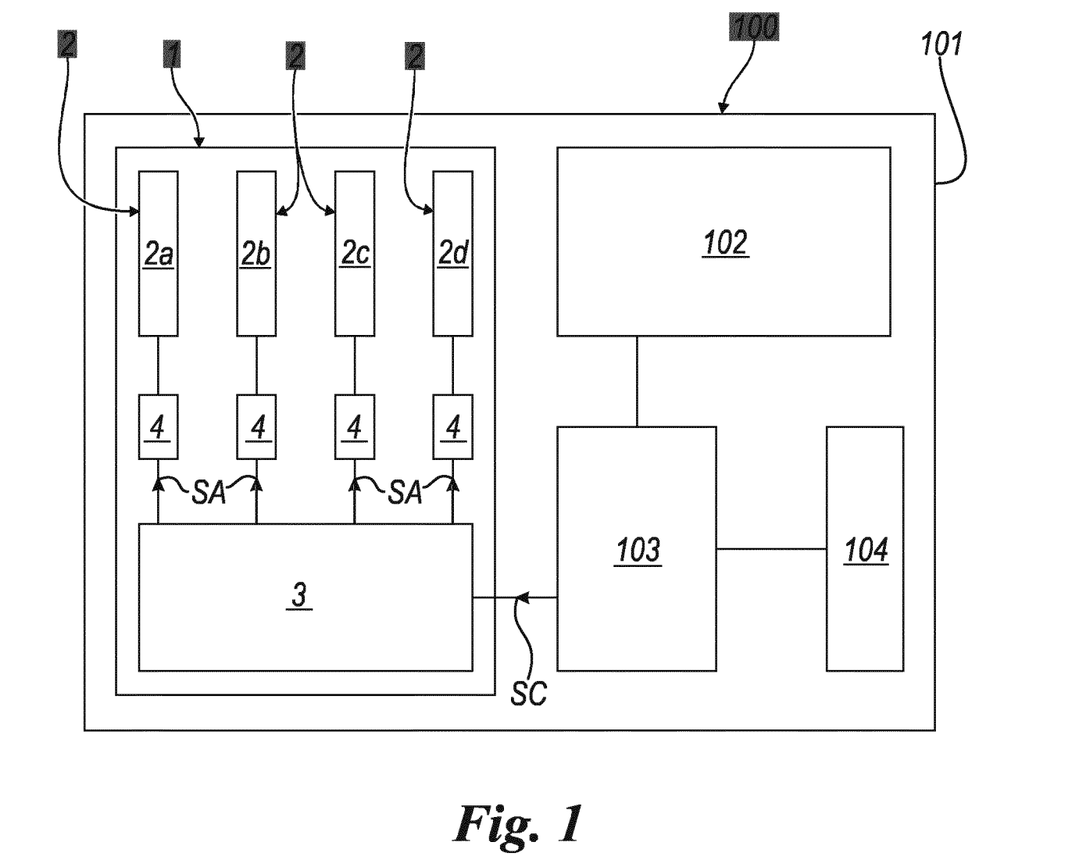
FIG. 1 is a schematic representation of a propulsion system for small satellites according to the present invention.

The system 1 comprises a control unit 3 connected functionally to the engines 2 for sending activation signals "AS" to said engines 2, for activating one or more engines 2 as a function of a selected operational configuration, or operating mode. Each configuration represents a different mode of operation. The configurations are not physical configurations, as in the physical arrangements of components, but are configurations of the control of the satellite, i.e. operating modes of the control unit. The terms mode and configuration are used interchangeably hereinafter. The different modes may be pre-stored in the control unit 3 in advance.

System 1 further comprises at least one ignition device 4 positioned operationally between the control unit 3 and the engines 2 for receiving the activation signal "AS" and for executing ignition of the respective engine 2.

As an example, the system 1 comprises a plurality of ignition devices 4, each associated with a respective engine 2.

The ignition device 4 constitutes a safety system for preventing the engines 2 igniting unintentionally and accidentally. For this purpose, the ignition device 4 comprises a plurality of "barriers" or safety mechanisms that must be overcome to be able to effectively start the engine 2 in question. As an example, the safety mechanisms may be mechanical and/or electronic and/or electrical and/or software.

According to the present invention, system 1 is configurable between a first configuration, or configuration for orbit correction (re-orbiting), and a second configuration, or dispersion configuration. In other words, the control unit 3 can operate in at least two different modes. In a first mode, the control unit 3 controls the engines 2 to correct the orbit of the satellite 100. In a second mode the control unit 3 controls the engines 2 to disperse the satellite in relation to other satellites 100 in the constellation.

In the first configuration, the control unit 3 commands the starting of one or more engines 2 to allow the satellite 100 to correct its orbit and take it to a higher altitude. This configuration is adopted when, after a long period of operation of the satellite 100, it has suffered notable orbital decay and is nearing natural destruction. In this configuration, the satellite 100 increases the altitude of the orbit, thus prolonging its working life. In other words, in the first mode, the control unit 3 controls the engines 2 in such a way as to effect orbit correction of a satellite 100.

In the second configuration, the control unit 3 commands the starting of one or more engines 2 to allow the satellite 100 to move a suitable distance away from other identical or similar satellites 100 in the case when a constellation of satellites 100 is launched into orbit. This configuration is adopted during orbital positioning of the constellation of satellites 100 to obtain correct dispersion of said satellites 100 in short enough times. In other words, in the first mode, the control unit 3 controls the engines 2 in such a way as to effect dispersion of a satellite 100 in the constellation.

Preferably, but not exclusively, system 1 is configurable between the first configuration, the second configuration and/or the third configuration, or configuration for departing from orbit (de-orbiting).

In the third configuration, the control unit 3 commands the starting of one or more engines 2 to allow the satellite 100 to depart from its orbit, preferably towards the planet around which it is orbiting. This configuration is activated when it is necessary to cause the satellite 100 to re-enter the atmosphere before the end of its working life as a result, for example, of a fault that compromises its functionality. In other words, in the third mode, the control unit 3 controls the engines 2 in such a way as to effect de-orbiting of a satellite 100.

Advantageously, this configuration may be selected in order to avoid leaving an unusable satellite in orbit, which may be an obstacle to other objects in orbit or may even constitute a danger to the safety of the other orbiting objects.

Preferably, but not exclusively, system 1 is configurable between the first configuration, the second configuration and/or the third configuration, or configuration for departing from orbit (de-orbiting) and a fourth configuration or configuration for preventing collisions.

Advantageously, the fourth configuration, or configuration for preventing collisions is activated when an urgent change of orbit is necessary for avoiding a collision with any other satellite. In other words, in the third mode, the control unit 3 controls the engines 2 in such a way as to avoid a collision.

In the case when system 1 is configurable only in the first and/or second configuration, this may comprise two, preferably three, engines 2. In this case, one or two engines 2 are reserved for the first configuration and another engine 2 is reserved for the second configuration.

In the case when system 1 is also configurable in the third configuration, system 1 comprises a suitable engine 2 reserved for this configuration.

Typically, at least one engine 2 is reserved for each operating mode of the control unit 3.

In the preferred embodiment, system 1 comprises four engines 2, separate and independent of one another, and in use, each is fixed to the frame 102 of the satellite 100.

In accordance with the foregoing, the four engines 2 can be activated selectively depending on the configuration selected.

Generally, the system 1 comprises a plurality of engines 2 and the control unit 3 operates in a plurality of configurations or operating modes. Each configuration or operating mode of the control unit 3 is associated with a particular combination of engines 2. In each mode a different combination of engines 2 is activated. In some examples, in each mode different engines 2 activated. For example, the system may comprise four engines and the control unit 3 may be operable in one of three modes. In this case the first mode may activate two engines 2, the second mode may activate a further engine 2 and the third mode may activate a further, final engine 2.

For this purpose, the control unit 3 is connected, via respective ignition devices 4, to a first engine 2a and a second engine 2b for sending their respective activation signals "AS" for igniting them when the first configuration is selected, i.e. the one for orbital correction.

Ignition both of the first engine 2a and of the second engine 2b is preferable for correcting the orbit, but is not indispensable. In fact, even activation of just one, either the first engine 2a or the second engine 2b, may be sufficient for effecting the necessary correction.

Moreover, the control unit 3 is connected via the respective ignition device 4 to a third engine 2c for sending an activation signal "AS" for igniting it when the second configuration is selected.

In the case when the third configuration is also selectable, the control unit 3 is connected via the respective ignition device 4 to a fourth engine 2d for sending an activation signal "AS" for igniting it when the third configuration is selected.

In each different operating mode, the control unit 3 sends activation signals to a different combination of engines 3.

Advantageously, the control unit 3 is connected functionally to the processing unit 103 of the satellite 100.

It is in fact the processing unit 103 of the satellite 100 that processes and sends a configuration signal "CS", representing the configuration selected, to the control unit 3 of system 1. In other words, the operating mode of the control unit 3 is determined based on a configuration signal from the satellite 100.

The processing unit 103 of the satellite 100 produces the configuration signal "CS" based on signals and information received from the communication device 104 and sent from the control station.

It should be pointed out that the control unit 3 of the propulsion system 1 and the processing unit 103 of the satellite 100 are two separate hardware elements. Alternatively, the control unit 3 of the propulsion system 1 and the processing unit 103 of the satellite 100 may be integrated in a single hardware element.

Figure 4:
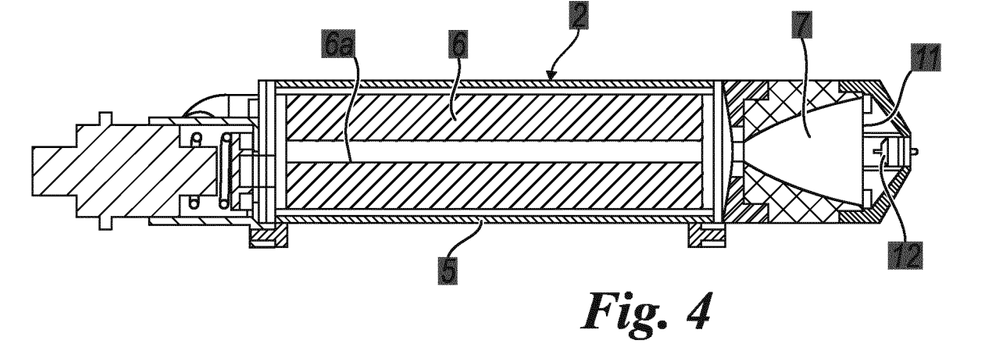
FIGS. 4 and 5 are perspective views of two respective alternative embodiments of a second detail of the system in FIG. 1.

The engines 2 may be of the solid propellant type (FIG. 4).

In that case, they comprise a cylindrical central body 5 that contains the propellant grain 6 and a nozzle 7 for expulsion and acceleration of the gases produced by combustion.

The propellant grain 6 may be hollow. In that case, the grain has a cylindrical cavity 6a, coaxial with the central body 5 (FIG. 4). Once ignited, the combustion surface will be that of the cylindrical cavity.

Alternatively, in an embodiment that is not illustrated, the propellant grain 6 is solid and has a circular base surface which, once ignited, defines the combustion surface. This is called "cigarette-burning".

In both cases, the propellant used is a mixture of HTPB (hydroxyl-terminated polybutadiene), ammonium perchlorate and non-agglomerating ceramics.

Purely as an example, the solid-propellant engine 2 has a length of between 70 mm and 90 mm, preferably substantially equal to 80 mm, and a diameter of between 17 mm and 21 mm, preferably substantially equal to 19 mm.

Advantageously, this type of engine 2 has a high degree of reliability and compactness. This type of engine 2 can only be ignited once. After ignition the solid fuel burns until the fuel is completely consumed. This provides the advantage of providing a simple, yet reliable propulsion system. In this case, the control of the engines 3 is binary, i.e. do not burn or burn completely, therefore robust.

Figure 5:
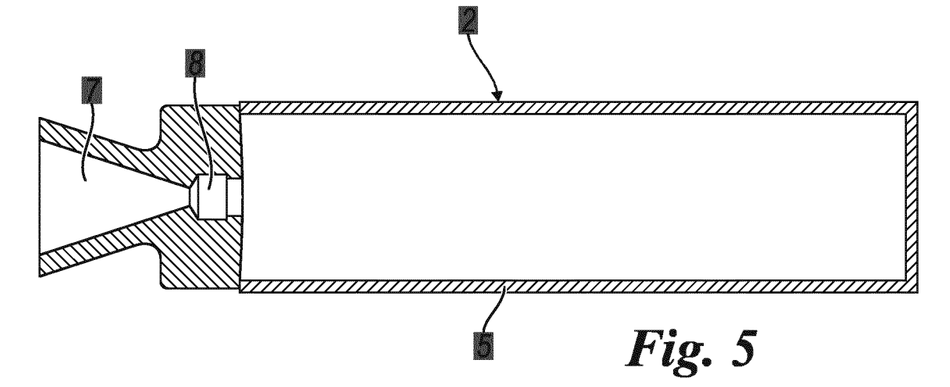

In the embodiment in FIG. 5, the engines 2 are of the type with compressed gas, for example air. In this case too, the engines 2 comprise a central body 5 that contains the compressed gas and the expansion nozzle 7. In that case, the engines 2 comprise a valve 8 positioned between the central body 5 and the nozzle 7 for controlling the passage of gas through the nozzle 7.

Advantageously, this type of engine 2 is of lower cost. However, it has a lower degree of reliability.

Purely as an example, the compressed-gas engine 2 has a length of between 70 mm and 90 mm, preferably substantially equal to 80 mm, and a diameter of between 17 mm and 21 mm, preferably substantially equal to 19 mm.

In alternative embodiments that are not illustrated, the engines 2 may be the hybrid type or gel type. Advantageously, these types of engine are re-ignitable and also allow partial and/or intermittent activation.

It should also be noted that system 1 may comprise some engines 2 of the type with solid propellant and some other compressed-gas engines, or hybrid or gel type engines.

Preferably, all of the engines 2 of system 1 are of the same type.

In alternative variants, the nozzles 7 of the engines 2 are sealed and filled with compressed gas.

In that case, the outlet section of each nozzle 7 is closed by a membrane 11 to keep the compressed gas inside said nozzle 7.

A perforating device 12 is arranged externally to the nozzle 7 and is activated to perforate the membrane 11, causing the compressed gas to escape.

In this way, a small thrust is produced, which may be utilised for implementing the dispersion configuration (or second configuration).

As an example, the perforating device 12 may comprise a pyrotechnic charge.

It should be noted here that the membrane 11, the perforating device 12 and the nozzle 7 under pressure are features that are advantageous, but not necessary.

Irrespective of the type of engine 2 or nozzle 7, the nozzles 7 may be aligned with the centre of mass of the satellite 100 to avoid excessive torque on the satellite 100 when the engines 2 are activated. This can be achieved by, for example, setting the nozzle angle relative to the rest of the engine 2 prior to launch or the satellite 100.

System 1 further comprises at least one supporting element 9, on which the engines 2 are fixed and which, in use, will be fixed to the frame 101 of the satellite 100. The frame 101 is shown schematically by the dotted line in FIGS. 2 and 3.

Figure 2:
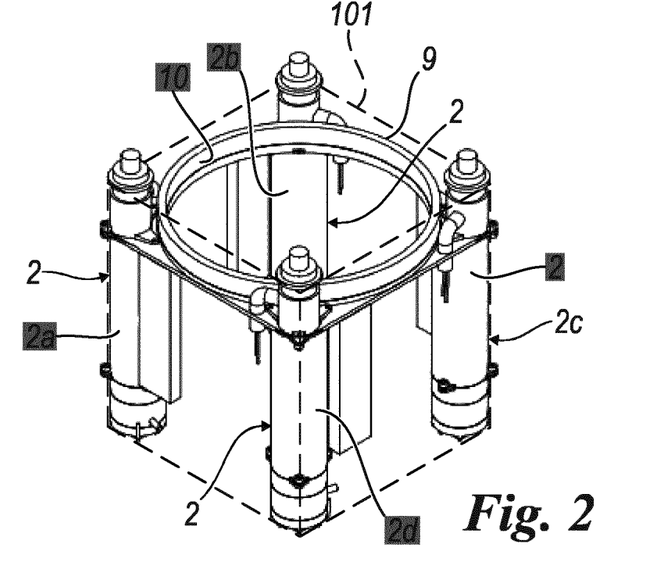
FIGS. 2 and 3 are perspective views of two respective alternative embodiments of a first detail of the system in FIG. 1.

In the embodiment illustrated in FIG. 2, system 1 comprises a single supporting element 9 of substantially quadrangular shape. For example, the supporting element 9 could have a square-shaped profile (as viewed in a direction parallel to the engines 2 or perpendicular to a face of a cube-shaped satellite 100). This arrangement allows the supporting element 9 to fit conformally with the cube-shaped frame 101 of the satellite 100 to minimise the space occupied by the engines.

So that it can be inserted in the modules that make up the satellite 100, the supporting element 9 has a side with length substantially equal to 10 cm. The precise length depends on the size of the satellite 100, but generally the supporting element has a side length substantially the same as the side length of the frame 101 of the satellite 100.

In this case, the engines 2 are arranged to correspond to the four vertices of the supporting element 9. As illustrated, the engines 2 extend orthogonally to the supporting element 9 and loosened from it. The engines 2 are therefore parallel to one another. The engines 2 are arranged at the edges of the cube-shaped frame.

Figure 6:
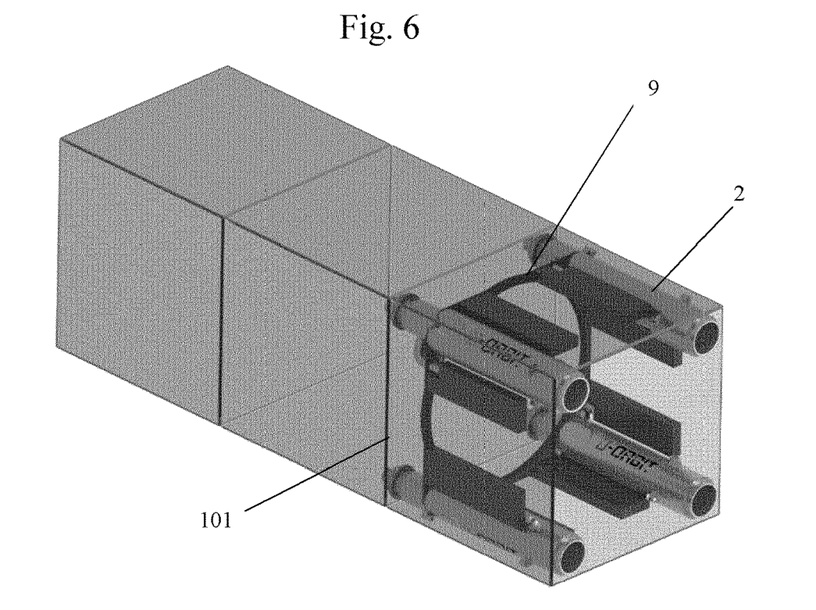
FIG. 6 shows a further embodiment of the system in FIG. 1.

The supporting element 9 has a central opening 10 of circular shape for housing the operational device 102 of the satellite 100. The engines 2 may be located in portions of a square-shaped supporting element 9 between the square-shaped periphery of the supporting element 9 and the central opening 10 within it, typically in corner portions of the square-shapes supporting element 9. FIG. 6 shows this arrangement schematically within a satellite (100).

Figure 3:
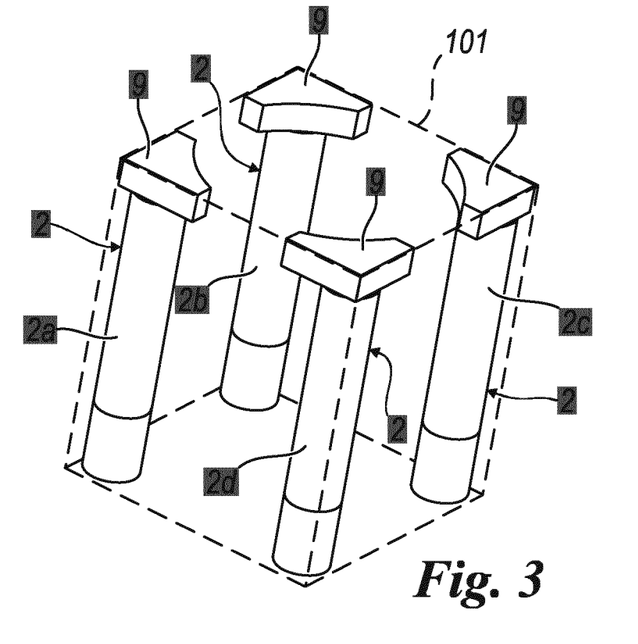

In the embodiment in FIG. 3, system 1 comprises four separate supporting elements 9 of substantially angular shape. Angular shape in the context of this example means a shape having a profile (as viewed in a direction parallel to the elongate axis of the engines 2 or perpendicular to a face of a cube-shaped satellite 100) in which two sides are at right angles to each other. This arrangement allows the supporting elements 9 to fit conformally with the corners of the cube-shaped frame 101 of the satellite 100 to minimise the space occupied by the engines.

The portion of the supporting elements 9 between the sides at right angles could be substantially straight, or as shown in FIG. 3, could include a curved portion. The curved portion is preferably concave to house the operational device 102 of the satellite 100. The profile (as viewed in a direction parallel to the elongate axis of the engines 2, or perpendicular to a face of a cube-shaped satellite 100) of the concave portion is preferably a circular arc. Preferably the arc-shaped concave portions of each of the four supporting elements 9 are located on the circumference of the same circle, i.e. form portions of a circle. The circle shape formed can house the operational device 102 of the satellite 100.

Each engine 2 is fixed to a respective supporting element 9 that will then be fixed in corresponding angular positions of the frame 101 of the satellite 100 (shown by a dotted line).

The engines 2 may be arranged on the supporting elements 9 such that they are located at a peripheral portion of the compartment defined by the frame 101 of the satellite 100. The engines 2 may be arranged at parallel edges of the substantially parallelepiped frame 101, i.e. in corner portions of a cube-shaped frame 101. Four engines 2 may be provided, for example. The position and orientation of the engines 2 described here allows symmetrical distribution of the mass of said engines 2 and makes it possible to leave a central space of the compartment free for the instrumentation.

The supporting element 9 can be configured such that the engines 2 are located within the volume between an inscribed cylinder within the cube-shaped satellite 100 and the frame of the cube-shaped satellite 100. This arrangement maximises the space available for the operational device 102.

In every case, the position and disposition of the engines 2 may be determined with considerable discretion depending on the requirements and, for example, depending on management of the masses of the instrumentation to be mounted on the satellite 100.

Figure 7:
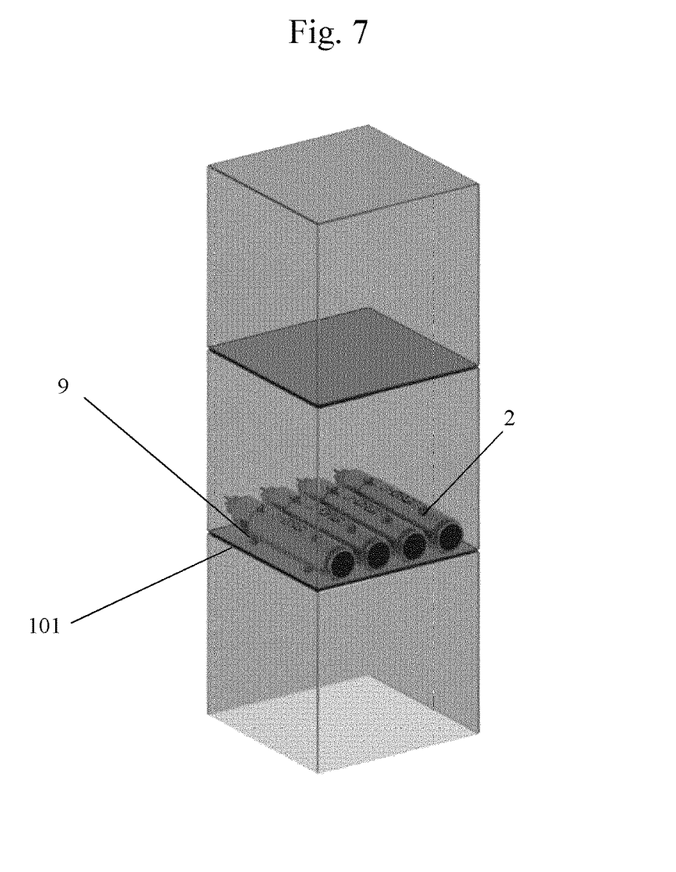
FIG. 7 shows a further embodiment of the system in FIG. 1.

In the embodiment shown in FIG. 7, the system comprises a single supporting element 9 which is substantially planar. In this arrangement the engines 2 arranged in a substantially planar configuration. The engines 2 may be arranged substantially in parallel to each other on the supporting element 9.

In general, the engines 2 are permanently fixed in position on the satellite 100 during the lifetime of the satellite 100. That is, once fixed to the satellite 100, the engines 2 are not designed to be relocated during the lifetime of the satellite 100. In such an arrangement, the direction of thrust provided by each engine 2 in relation to the satellite 100 is also fixed, i.e. predetermined. This results in a robust propulsion system.

System 1 further comprises an inertia wheel (not illustrated) necessary for controlling the attitude of the satellite 100.

The inertia wheel is connected functionally to the control unit 3.

Advantageously, the inertia wheel has an annular shape.

This allows the inertia wheel to be positioned with greater flexibility. In fact, the annular shape means that the inertia wheel can be arranged so that further components of the satellite 100 can be located inside said wheel. In other words, the annular shape of the wheel makes it possible to utilise the space defined within said wheel.

The inertia wheel provides the satellite 100 with means for controlling the direction of thrust from the engines 2 in the case that direction of thrust of the engines 3 are fixed relative to the satellite 100.

The present invention further relates to small satellites as described above.

Moreover, the present invention relates to a method for managing the propulsion system for small artificial satellites.

The method comprises the preliminary step of preparing the satellite 100 comprising the propulsion system 1.

As already stated above, the control unit 3 of system 1 is connected to the processing unit 103 of the satellite 100.

Once the satellite 100 or the plurality of satellites 100 of the constellation have been launched, the configuration of system 1 is determined.

The configuration is selected from the first (for orbital correction), the second (for dispersion) and, in the embodiments where this is envisaged, the third (for removal from orbit).

The configuration is selected by the operators tasked with mission control and is communicated by radio to the satellite 100 or to the satellites 100.

The choice of configuration to adopt depends on the operational phase.

At the end of the launch procedure, when the satellites 100 have been put into orbit, the second configuration is activated to allow quick and effective dispersion of the satellites 100 in the case of a constellation.

When, after a long operational phase, orbital decay reaches a predetermined threshold (based on the nature of the mission), the first configuration is activated to raise the orbit again to operational values and allow continuation of the mission.

Finally, where envisaged and if it is necessary to remove the satellite 100 from its orbit (for example as a result of a fault that makes it unusable), it is possible to activate the third configuration to remove it from orbit towards Earth and destroy it.

The configuration is determined by sending a control signal from the control station, which is received by the processing unit 103 of the satellite 100. The processing unit interprets the control signal, generates the configuration signal "CS" and sends it to the control unit 3 of system 1.

The control unit 3 then generates the activation signal "AS" (or the activation signals "AS") and sends them to the engine 2 (or to the engines 2) for executing the configuration determined.

In detail, the control unit 3 may generate an activation signal "AS" representative of the activation of the first engine 2a and/or of the second engine 2b when the configuration signal "CS" is representative of the first configuration.

The control unit 3 may generate an activation signal "AS" representative of the activation of the third engine 2c when the configuration signal "CS" is representative of the second configuration.

The control unit 3 may generate an activation signal "AS" representative of the activation of the fourth engine 2d when the configuration signal "CS" is representative of the third configuration.

The invention thus described achieves the required aims.

In fact, the use of the propulsion system for small artificial satellites makes it possible to increase the overall operating life of the satellites on which it is mounted.

In detail, firstly the use of the system described shortens appreciably the times necessary to achieve optimum dispersion. The time saved in this phase is reflected in a longer working life.

Moreover, by allowing correction of the deteriorated orbit as a result of decay, this can delay the end of the working life.

Finally, the system allows quick removal of satellites from orbit. This advantage is even more significant, bearing in mind that launching small satellites (according to the definition given in the present text) is in exponential growth and it will be increasingly necessary to remove orbiting objects that are of no use and are potentially hazardous.

The invention claimed is:

1. A propulsion system for small artificial satellites, the propulsion system comprising:
    a plurality of engines fixable to a frame of a satellite, wherein the satellite is formed from one or more cube-shaped modules and has a mass less than or equal to 100 kilograms; and
    a control unit connected functionally to the engines for sending at least one activation signal (AS) for activating at least one engine,
    wherein the control unit is selectively configurable between at least two configurations pre-stored in the control unit, wherein the at least two configurations comprise a first configuration for correcting an orbit of the satellite and a second configuration for dispersing the satellite relative to another adjacent satellite, wherein each configuration corresponds to an activation of respective at least one engines of the plurality of engines such that the respective at least one engines are activated selectively depending on the configuration selected, and wherein each configuration corresponds to an activation of different engines of the plurality of engines.

2. The propulsion system according to claim 1, wherein the control unit is selectively configurable between the first configuration, the second configuration and a third configuration in which at least one of the engines is activated for causing the satellite to leave orbit, optionally towards a planet.

3. The propulsion system according to claim 1, wherein the propulsion system comprises four engines, independent of one another and fixable to the frame of the satellite, said engines capable of being selectively activated depending on the configuration selected.

4. The propulsion system according to claim 3, wherein the control unit is connectable to a processing unit of the satellite for receiving a configuration signal (CS) representative of the configuration required.

5. The propulsion system according to claim 4, wherein the control unit is connected to at least one first engine or second engine for sending the at least one activation signal (AS) to the first engine or second engine when the control unit receives the configuration signal (CS) representative of the first or second configuration.

6. The propulsion system according to claim 4, wherein the control unit is connected to a third engine for sending the at least one activation signal (AS) to the third engine when the control unit receives the configuration signal representative of a third configuration.

7. The propulsion system according to claim 4, wherein the control unit is connected to a fourth engine for sending the at least one activation signal (AS) to the fourth engine when the control unit receives the configuration signal representative of the first configuration, the second configuration or a third configuration.

8. The propulsion system according to claim 4, wherein the propulsion system comprises an inertia wheel connected to the processing unit, said inertia wheel being of annular shape.

9. The propulsion system according to claim 1, wherein the propulsion system comprises at least one supporting element on which the engines are fixed the supporting element being of substantially quadrangular shape, the engines being arranged to correspond to vertices of the quadrangular shape.

10. The propulsion system of claim 9, wherein the supporting element has a central opening for housing an operational device of the satellite.

11. The propulsion system according to claim 1, wherein the engines comprise corresponding sealed nozzles filled with compressed gas.

12. The propulsion system according to claim 1, wherein the propulsion system is part of an artificial satellite of small dimensions, artificial satellite comprising:

the frame, which is of substantially parallelepiped shape and defining a container compartment;

a processing unit contained in the container compartment;

the engines of the propulsion system being fixed to the frame; and the control unit of the propulsion system being connected functionally to the processing unit.

13. The propulsion system of claim 1, further comprising four engines, and wherein each engine is associated with a configuration.

14. A method of controlling a propulsion system of a small artificial satellite, the method comprising:

connecting a control unit of the propulsion system to a processing unit of a satellite, wherein the satellite is formed from one or more cube-shaped modules and has a mass less than or equal to 100 kilograms;

determining an operational configuration at least between a first configuration, for orbital correction of the satellite and a second configuration, for dispersion of the satellite, wherein each configuration corresponds to an activation of respective at least one engine of a plurality of engines of the satellite such that the respective at least one engines are activated selectively depending on the configuration determined;

generating a configuration signal (CS) representative of the configuration determined; and generating an activation signal (AS) as a function of the configuration signal (CS); the activation signal (AS) being representative of an activation of at least one engine.

15. The method according to claim 14, wherein the activation signal (AS) is representative of the activation of a first engine and of a second engine when the configuration signal (CS) is representative of the first configuration.

16. The method according to claim 14, wherein the activation signal (AS) is representative of the activation of a third engine when the configuration signal (CS) is representative of the second configuration.

17. The method according to claim 14, wherein the first configuration and the second configuration are pre-stored in the control unit.

18. The method according to claim 14, wherein the activation signal causes least one of the engines to cause the satellite to leave orbit, optionally towards a planet.

19. A propulsion system for small artificial satellites, the propulsion system comprising:

a plurality of engines fixable to a frame of a satellite, wherein the satellite has a mass less than or equal to 100 kilograms; and a control unit connected functionally to the engines for sending at least one activation signal (AS) for activating at least one engine, wherein the control unit is selectively configurable between at least two configurations pre-stored in the control unit, wherein the at least two configurations comprise a first configuration for correcting an orbit of the satellite and a second configuration for dispersing the satellite relative to another adjacent satellite, wherein each configuration corresponds to an activation of respective at least one engines of the plurality of engines such that the respective at least one engines are activated selectively depending on the configuration selected, and wherein each configuration corresponds to an activation of different engines of the plurality of engines.

20. The propulsion system according to claim 19, wherein the propulsion system comprises at least one supporting element on which the engines are fixed, the supporting element being of substantially quadrangular shape, the engines being arranged to correspond to vertices of the quadrangular shape.

* * * * *